United States Patent

Kovacs

[11] 3,901,463
[45] Aug. 26, 1975

[54] LIFT AND PROPULSION MEANS FOR A VERTICAL TAKE-OFF AND LANDING AERODYNE

[76] Inventor: André Kovacs, 177, rue de la Convention, 75015 Paris, France

[22] Filed: Apr. 3, 1974

[21] Appl. No.: 457,339

[30] Foreign Application Priority Data
Apr. 6, 1973   France .............................. 73.12497

[52] U.S. Cl. ......... 244/12 CW; 244/34 A; 244/45 R
[51] Int. Cl.² ......................................... B64C 29/00
[58] Field of Search .......... 244/12 CW, 12 R, 34 A, 244/45 R, 23 R, 73 R, 69

[56] References Cited
UNITED STATES PATENTS

| | | |
|---|---|---|
| 1,368,891 | 2/1921 | Carlson.................. 244/12 CW UX |
| 1,859,044 | 5/1932 | Moe........................ 244/12 CW UX |
| 2,532,481 | 12/1950 | Custer............................ 244/12 CW |

*Primary Examiner*—Trygve M. Blix
*Assistant Examiner*—Barry L. Kelmachter
*Attorney, Agent, or Firm*—Alan H. Levine

[57] ABSTRACT

A vertical take-off and landing aerodyne provided with wings and a chamber of semi-circular section extending fore and aft with open front and rear ends and an open underside. Spaced, coaxial, driven front and rear propellers in the chamber having opposite pitches during take-off and landing so that air drawn into the chamber in opposite directions is forced through the open underside to provide the lift. The pitch of the rear propeller is reversible to correspond to the first propeller for forward flight.

6 Claims, 6 Drawing Figures

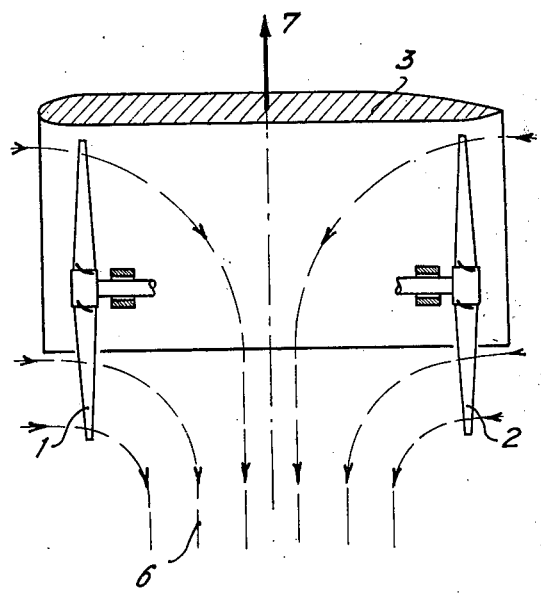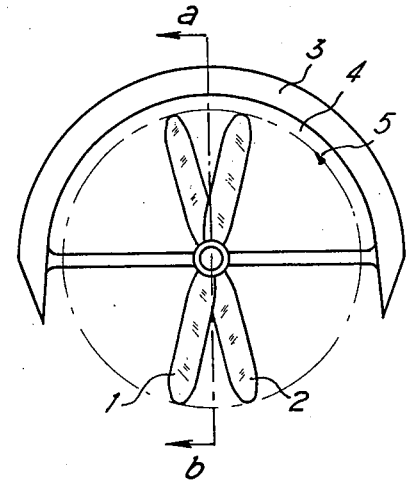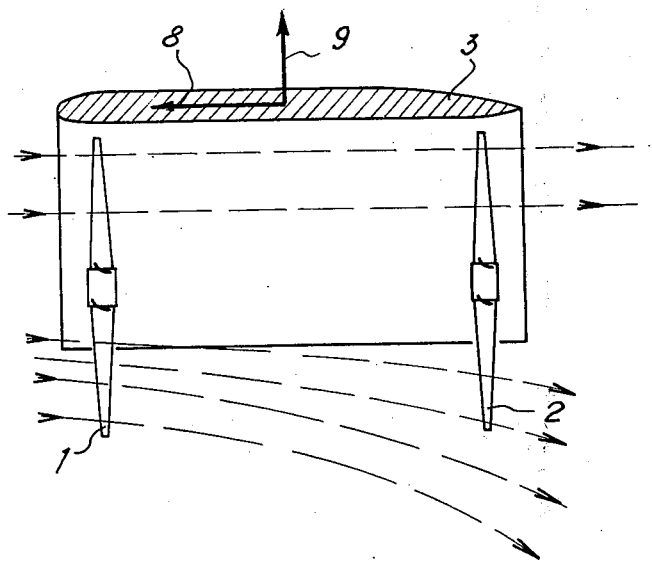

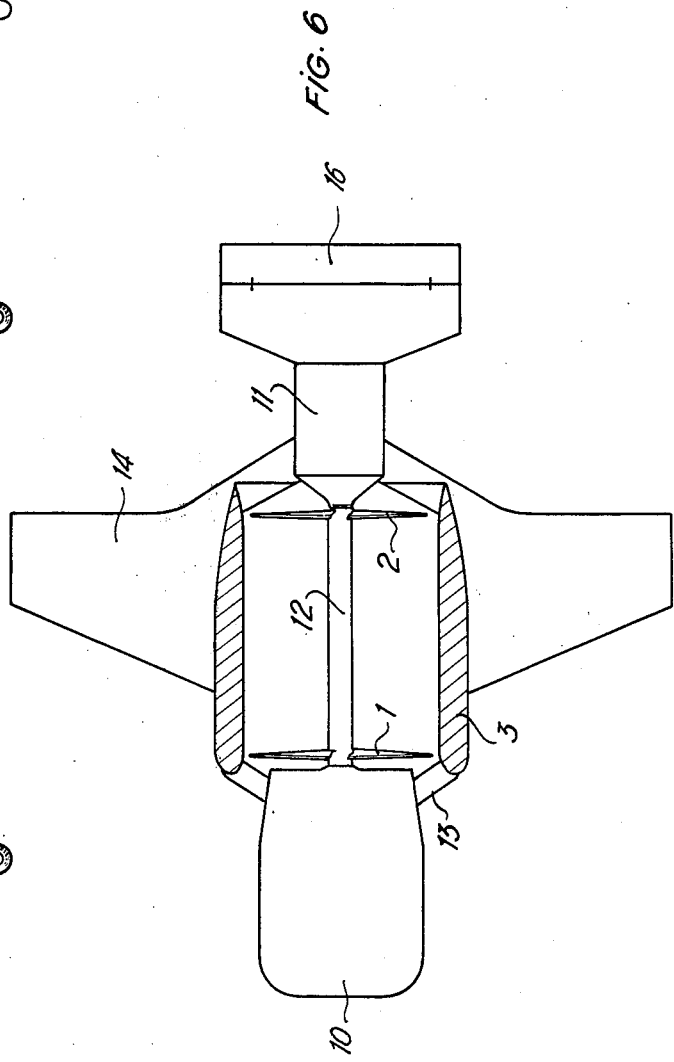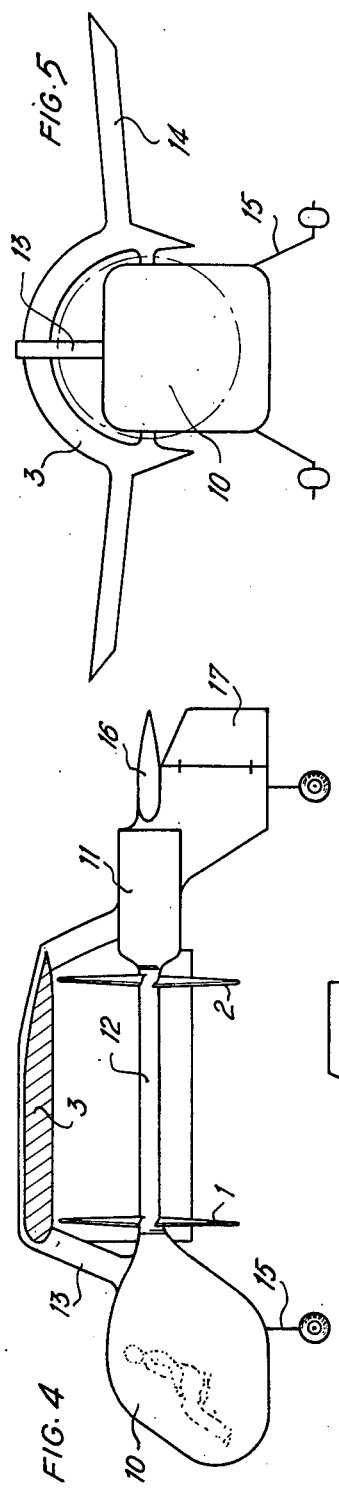

LIFT AND PROPULSION MEANS FOR A VERTICAL TAKE-OFF AND LANDING AERODYNE

The present invention relates to lift and propulsion means for an aerodyne capable of vertical take-off and landing.

In the last analysis, it is known that the lift of any aerodyne is due to the impulse imparted in a downwards direction to a certain mass of air, by means varying according to the type of aerodyne. Thus, the lift of an aircraft is due to the impulse of the air displaced by the wings, that of the helicopter to the impulse of the air drawn in a downwards direction by the rotors etc.

The lift means used for the helicopter, which facilitate vertical take-off and landing, limit its forward speed and the various solutions, particularly in the form of a combined helicopter, do not make it possible to reach the high forward speeds of aircraft.

The various proposals made for ensuring the vertical take-off and landing of aircraft have hitherto not succeeded in resolving the critical problem of passing from vertical flight to horizontal flight, in complete safety.

The solution according to the invention, whilst facilitating vertical take-off and landing, allows a progressive passage from vertical flight to horizontal flight and vice versa, which provides the requisite safety during this critical transition.

The means proposed by the invention to be provided on an aerodyne comprise at least two propellers, whereof at least one has a variable pitch, arranged coaxially along a substantially horizontal axis and co-operating with an airfoil in the form of a semi-circular dome or "canopy" placed above the two propellers, such that for take-off or landing, with an appropriate direction of rotation, the propellers draw in the ambient air in the opposite direction in order to force it into the space between the two propellers, where this air is deflected downwards by the dome, thus producing a vertical lift force on the latter, whereas, for transition to forwards flight, by reversing the pitch of one of the two propellers, the air streams stirred up by the two propellers are added in a substantially horizontal direction.

Thus, by selecting appropriate dimensions and outputs of the propellers, it is possible to obtain the lifting force necessary for the vertical flight of the aerodyne equipped with the means according to the invention.

By regulating the direction and value of the pitch of the variable pitch propeller, all the desired ratios between lift and propulsion are progressively produced, from solely lift without propulsion (for vertical take-off and hovering) to propulsion without lift for horizontal flight. For this latter type of flight, it is naturally necessary that the aerodyne has wings capable of ensuring part of the lift after take-off. Furthermore, the dome itself may advantageously constitute all or part of these wings.

Finally, the means proposed make it possible to produce aerodynes capable of vertical take-off and landing, in which the transition between vertical flight and horizontal flight is obtained by the simple progressive reversal of the pitch of a propeller. The aerodyne may be provided with any number of lift and propulsion means according to the invention: a single one placed above or in the extension of the fuselage; two on either side of the fuselage etc.

Varying the pitch of a propeller is a very simple operation, compared with those required by the other type of aircraft having vertical take-off and landing: swinging a complete wing with its engines, swinging the engine shafts, deploying flaps occupying more than 50% of the wing area, swinging complete ducted fans etc...

Finally, it should be noted that in the embodiment according to the invention, the propellers are ducted over approximately 50% of their circular extent, which contributes to improving their efficiency. Leakages which occur are directed downwards, i.e., in the direction favouring lift.

The following description with the accompanying drawings will make it easier to understand how the invention may be used.

In the drawings:

FIG. 1 is an elevational diagram with partial section of lift/propulsion means according to the invention;

FIG. 2 is a sectional view of these means;

FIG. 3 is similar to FIG. 1 and shows the flow of air during forward flight;

FIGS. 4, 5 and 6 are an elevational view with section, an end view and a plan view with section respectively, showing an aerodyne equipped with lift/propulsion means according to FIGS. 1 to 3.

The lift and propulsion means according to the invention, illustrated in FIGS. 1 to 3, comprise at least two propellers 1 and 2, substantially of the same diameter and arranged coaxially on a substantially horizontal axis, these propellers are rotated in any conventional manner, by one or more engines. Located above these propellers is an airfoil in the shape of a dome 3 of substantially semi-circular section, enclosing them to a greater or lesser degree. The space 4 between the dome 3 and circle 5 described by the end of the propellers is slight.

The pitch of the propellers and the direction of their rotation are chosen such that the two propellers draw in the ambient air in opposite directions, in order to force it into the space between the two propellers. In the case of FIG. 1, the propeller 1 moves the air from left to right, whereas the propeller 2 moves the air from right to left. Under these circumstances, since the dome 3 prevents any upwards flow of air, the entire air flow of the two propellers is forced to flow downwards, as indicated by the current lines such as 6. The amount of movement, directed in a downwards manner, of this air flow, produces an upwards lift force on the dome 3, shown by the vector 7. For a lift force greater than the weight of the aerodyne equipped with the means described, the aerodyne will lift off vertically.

According to a particular feature of the invention, at least one of the two propellers is provided with a device known per se, making it possible to vary its pitch until it is reversed. The propeller 2, for example, may be provided with a device of this type. FIG. 3 illustrates the flow produced when the pitch of the propeller 2 is inverted but remains slightly less than the pitch of the propeller 1: the bulk of the flow is directed from left to right, which gives a propulsion force towards the left, illustrated by the vector 8. The difference in pitch of the propellers 1 and 2 produces a difference in their output: the excess output of the propeller 1 with respect to that of the propeller 2 may only flow downwards, due to the dome 3, which produces a lifting force illustrated by the vector 9.

If the two propellers had a fixed pitch, or at the very least if the pitch of one of them could not be reversed, a similar effect on the flow could still be obtained by reversing the direction of rotation of one of the propellers, for example the propeller 2 of FIG. 1. But it is generally preferable to reverse the pitch, since this operation does not have to overcome considerable inertia, as when reversing the direction of rotation.

FIGS. 4 to 6 illustrate a non-limiting embodiment of an aircraft using a single lift/propulsion means according to the invention. The aircraft comprises a cabin 10 connected to a rear engine group 11 by a shaft 12 which supports the propellers 1 and 2. Located above the propellers is the dome 3 supported by appropriate uprights 13. This dome 3 is connected to a wing 14. The system is completed by landing assemblies 15 and rudders and ailerons 16, 17 of conventional design. Naturally, no structure may be located below the propellers 1 and 2 and the girders such as 13 may be appropriately profiled in order to disturb the flow of air admitted to the dome 3 as little as possible.

The same principle may be applied to two-engined systems, i.e., comprising two domes which may constitute a part of the support wing.

What is claimed is:

1. Lift and propulsion means for a vertical take-off and landing aerodyne, comprising:
   a. a single drive shaft and power means for rotating said shaft,
   b. at least two propellers mounted on said shaft, said propellers being spaced apart along the length of said shaft, and the blades of at least one of said propellers having a variable and reversible pitch, and
   c. an arch-shaped airfoil above said shaft, said airfoil having a substantially semi-circular cross-sectional shap the shape of curvature of which is substantially coaxial with said shaft, said airfoil extending over both propellers and the sides of said airfoil extending down at least to the level of said shaft.

2. Lift and propulsion means as defined in claim 1 wherein said airfoil extends longitudinally beyond both propellers.

3. Lift and propulsion means as defined in claim 1 wherein the sides of said airfoil extend down below the level of said shaft.

4. Lift and propulsion means as defined in claim 1 wherein the region beneath said airfoil is unobstructed except for said shaft and propellers.

5. Lift and propulsion means as defined in claim 1 wherein said airfoil is unbroken from one of its ends to the other.

6. An aerodyne as defined in claim 1 including a wing, said airfoil forming part of said wing.

* * * * *